M. D. MYERS.
Hold-Backs.

No. 135,833. Patented Feb. 11, 1873.

Witnesses

Inventor
Michael D. Myers
by
William H. Low
his Attorney

UNITED STATES PATENT OFFICE.

MICHAEL D. MYERS, OF SCHUYLER, NEW YORK.

IMPROVEMENT IN HOLDBACKS.

Specification forming part of Letters Patent No. 135,833, dated February 11, 1873.

*To all whom it may concern:*

Be it known that I, MICHAEL D. MYERS, of Schuyler, in the county of Herkimer and State of New York, have invented a new Safety Holdback for attaching horses to vehicles, of which the following is a full and exact description, reference being had to the accompanying drawing making a part of this specification, in which—

Figure 1:
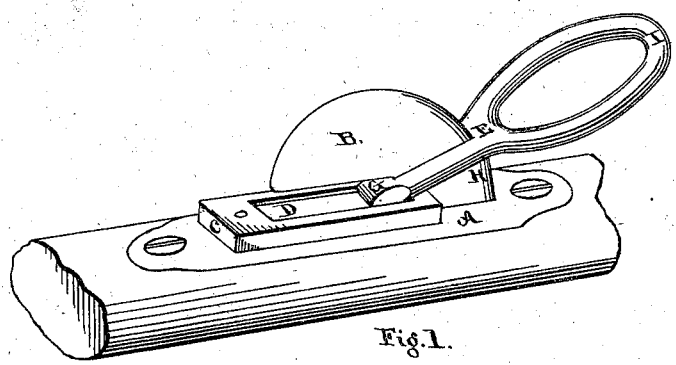
Figure 2:
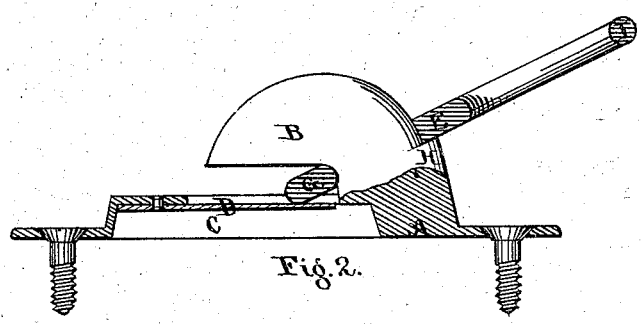
Figure 3:
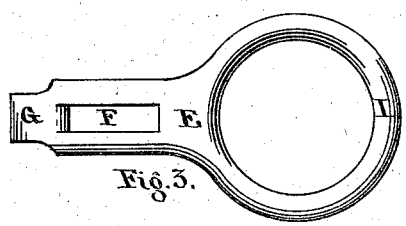

Figure 1 is a perspective view; Fig. 2, a vertical section; and Fig. 3, a detached view of the link.

The nature of my invention consists of the device, herein shown and described, for attaching horses to the shafts of wagons and other vehicles, and so arranged that by the falling of the shafts, through the breaking or derangement of the harness, or from any other cause, the holdback fastenings will become automatically detached, thereby freeing the animal from the wagon, and, by so doing, avoiding the danger attendant upon such accidents; also, in the construction and combination of the several parts thereof, as shown, so as to prevent the rattling noise common to holdback fastenings.

A is the base-plate having attached to its face a semicircular hook, B, to which, beneath the opening in the top of the chamber C, a spring, D, is secured. The link E has a slotted opening, F, formed in it, which allows it to pass freely over the hook B. Its elongated point G rests upon and receives the pressure of the spring D, whereby it is held in position upon the projection H formed upon the hook B, and prevented from rattling. A ring, I, is formed at the other extremity of the link for the purpose of securing the harness thereto.

The bed-piece A should be secured to the shafts of the wagon by screws or any equivalent means. The link E is inserted by sliding the point G endwise beneath the hook B, until it reaches the back of the opening; then, by raising the ring I so as to give the link a partial revolution, the slotted opening F passes over the hook B, the spring D yielding to the movement of the elongated point G until the link rests in its proper position upon the projection H, where the pressure of the spring retains it sufficiently firm to prevent any tendency to rattle.

If, by the breaking of the whiffletree, detaching of the traces, or any similar accident, whereby the animal secures sufficient forward movement to permit the shafts to drop, or, if thereby an undue forward strain is thrown upon the holdback fastening, the position of the link E is such that it readily becomes detached from the hook B, and the animal is consequently freed from the vehicle.

I do not, broadly, claim the use of a hook, link, and spring for holdbacks, as they have been heretofore used for this purpose; but

What I claim as my invention is—

The combination of the bed-piece A, its hook B having a projection, H, as herein described, and spring D with the link E having an elongated point, G, for the purpose specified.

Witnesses: MICHAEL D. MYERS.
H. H. INGHAM,
SETH WHEELER.